United States Patent
Huang et al.

(10) Patent No.: US 7,183,675 B2
(45) Date of Patent: Feb. 27, 2007

(54) PERMANENT MAGNET STEPPING MOTOR

(75) Inventors: Shih-Ming Huang, Hsinchu (TW);
Huo-Chu Chen, Chiai (TW); Wen-Shi Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 10/831,193

(22) Filed: Apr. 26, 2004

(65) Prior Publication Data

US 2004/0195921 A1    Oct. 7, 2004

Related U.S. Application Data

(63) Continuation-in-part of application No. 10/356,588, filed on Feb. 3, 2003, now abandoned.

(30) Foreign Application Priority Data

Apr. 26, 2002   (TW) ................. 91205791 U

(51) Int. Cl.
*H02K 21/12*   (2006.01)
(52) U.S. Cl. .................................. 310/49 R
(58) Field of Classification Search .......... 310/49 R, 310/194, 156.01–156.84, 268, 254, 258
See application file for complete search history.

(56) References Cited

U.S. PATENT DOCUMENTS

| 3,293,460 | A | | 12/1966 | Iwai et al. |
| 3,696,260 | A | * | 10/1972 | Lace ............. 310/156.71 |
| 4,127,802 | A | | 11/1978 | Johnson |
| 4,406,958 | A | | 9/1983 | Palmero et al. |
| 5,047,680 | A | | 9/1991 | Torok |
| 2002/0036437 | A1 | | 3/2002 | Kurosawa et al. |

\* cited by examiner

*Primary Examiner*—Thanh Lam
(74) *Attorney, Agent, or Firm*—Birch, Stewart, Kolasch & Birch, LLP

(57) ABSTRACT

A permanent magnet (PM) stepping motor includes a rotor structure and a stator. The rotor structure includes an axis, multipolar yoke stacks, and at least one spacer. Each of multipolar yoke stacks includes an N multipolar yoke, a permanent magnet and an S multipolar yoke combined as a hamburger-like structure, and each N pole of the N multipolar yoke and each S pole of the S multipolar yoke are alternately aligned. One of the spacer is sandwiched between each pair of the multipolar yoke stacks. The stator circumnavigates the axis and the multipolar yoke stacks, and provides a magnetic field for the multipolar yoke stacks to make the axis rotating. This PM stepping motor has the advantage of a minimized magnetic pole pitch and a high torque, which cannot be achieved in conventional stepping motors.

7 Claims, 6 Drawing Sheets

PERMANENT MAGNET STEPPING MOTOR

This application is a Continuation-In-Part of application Ser. No. 10/356,588, filed on Feb. 3, 2003 now abandoned, and for which priority is claimed under 35 U.S.C. § 120; and this application claims priority of Application No. 091205791 filed in Taiwan on Apr. 26, 2002 under 35 U.S.C. § 119; the entire contents of all are hereby incorporated by reference.

BACKGROUND OF THE INVENTION

1. Field of Invention

The invention relates to a stepping motor, and in particular to a claw pole permanent magnet (PM) stepping motor.

2. Related Art

The permanent magnet (PM) stepping motor including a permanent magnet whose surface with multiple poles, is a main stream of current motor technologies. However, the surface magnetic field of the rotor is directly produced by a permanent magnet, no matter whether the rotor is formed by a single magnet or two annular magnets, because the existing rotor structure of the PM stepping motor is limited by magnet materials and the magnetization technology.

FIG. 1 is a schematic view of the rotor structure of a conventional PM stepping motor with an integrally formed magnet, and it shows the rotor structure 10 of a conventional PM stepping motor formed by an integrally formed magnet. FIG. 2 is a schematic view of the rotor structure of a conventional PM stepping motor with two annular of magnets, and it shows the rotor structure 10a of a conventional PM stepping motor with two annular magnets 20, 30. These two kinds of rotor structures are limited by the fact that the magnetization strength of magnet materials cannot be decreased, and the pole pitch between two different poles cannot be further narrowed. Take a NdFeB magnet, which has the biggest magnetization strength over other applied magnets, as a example, the surface magnetic field is only about 1000 Gauss, when the pole pitch of the NdFeB magnet is less than 1 millimeter (mm.).

SUMMARY OF THE INVENTION

In view of the problem in the prior art, the invention provides a permanent magnet stepping motor. The invention utilizes two permanent magnets respectively sandwiched between two multipolar yokes a hamburger-like stack structure to form an equivalent multipolar magnetic field rather than using the conventional permanent magnet whose surface with multiple poles. Neither the magnet materials nor the magnetization technology does not limit the invention so that the less pole pitch, preferred 0.3 millimeters (mm.), can be achieved.

To achieve the above objective, the invention provides a permanent magnet stepping motors, which includes a rotor structure and a stator. The rotor structure includes an axis, a plurality of multipolar yoke stacks and more than one spacer. Each multipolar yoke stack is a hamburger-like structure constituted by an N multipolar yoke, a permanent magnet and an S multipolar yoke. Each N pole of the N multipolar yoke and each S pole of the S multipolar yoke are alternately arranged from top view. The pole pitch between N and S poles were the same as stator pole pitch. The spacer is between each two multipolar yoke stacks. Each of the N and S multipolar yokes can be a single-piece structure or a multi-piece structure. They can be made of silicon steel plates or other ferromagnetic materials. The stator, including a plurality of coils, circumnavigates the rotor structure and provides a magnetic field for the multipolar yoke stacks to make the axis rotating. The pole pitch between each N multipolar yoke and each S multipolar yoke is the same as the pole pitch between two adjacent coils of the stator when viewed along a direction of the axis.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects, features, and advantages of the invention will become apparent from the following detailed description of the preferred but non-limiting embodiments. The following description is made with reference to the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figure 2:
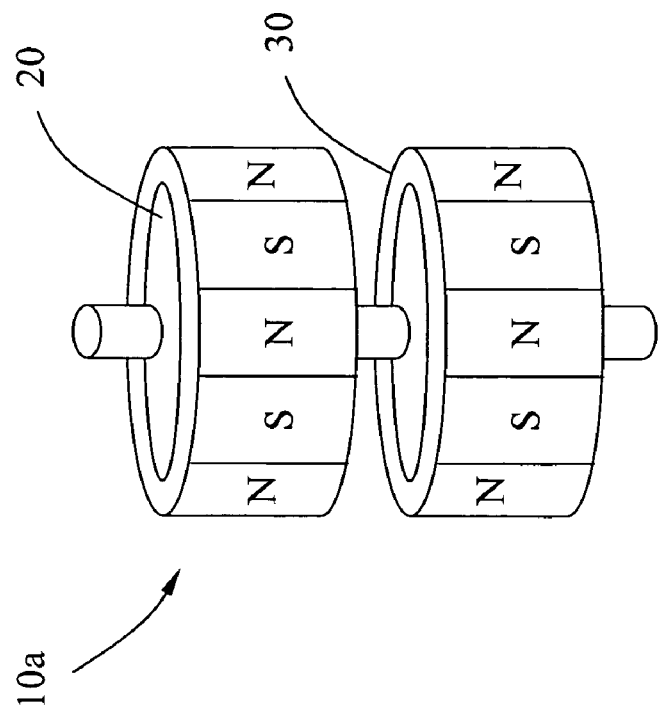
FIG. 2 is a schematic view of a rotor structure of a conventional PM stepping motor with two annular of magnets.
Figure 1:
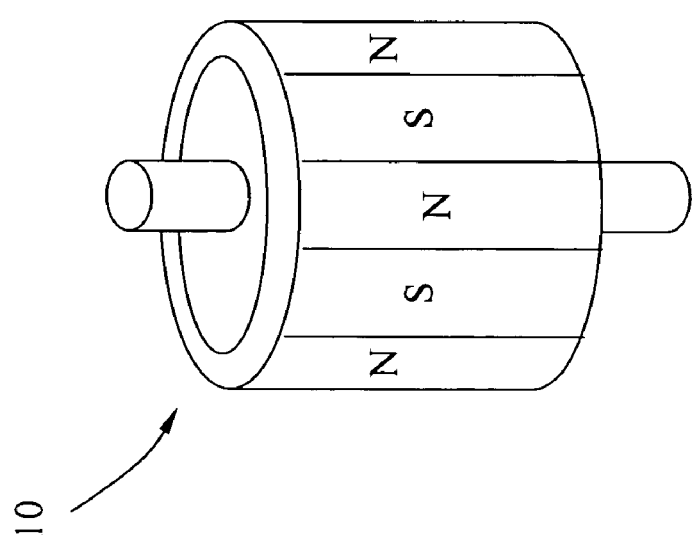
FIG. 1 is a schematic view of a rotor structure of a conventional PM stepping motor with an integrally formed magnet.
Figure 3A:
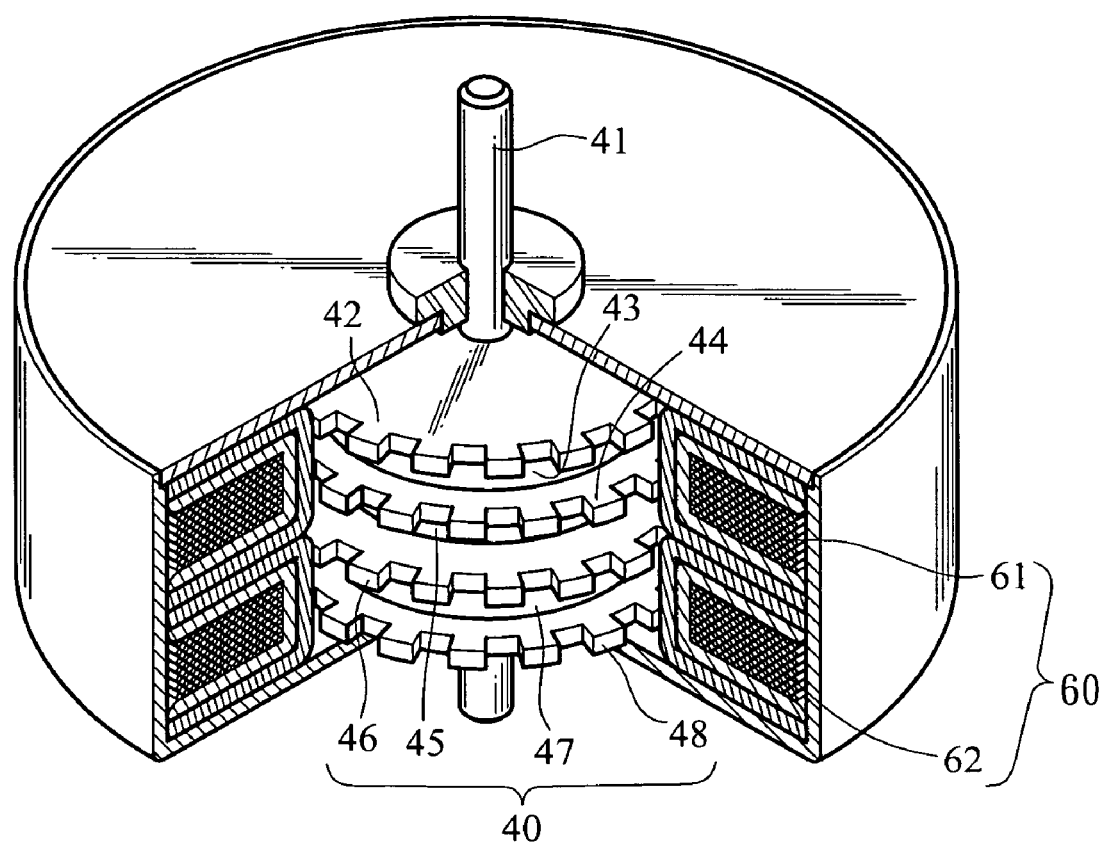
FIG. 3A is a schematic view of a permanent magnet stepping motor in the preferred embodiment of the invention.
Figure 3B:
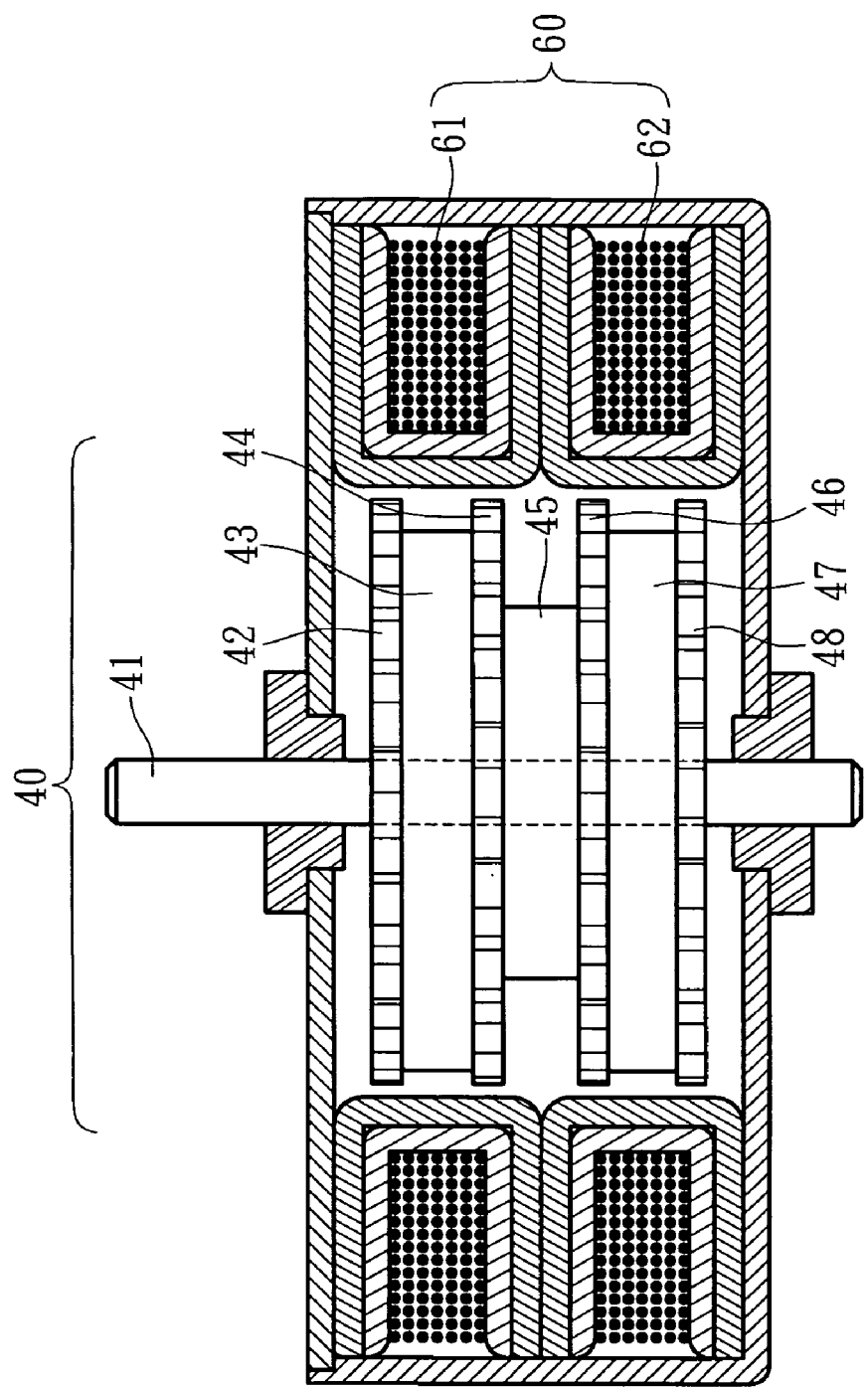
FIG. 3B is a cross-sectional view of the permanent magnet stepping motor in FIG. 3A.

FIG. 3A is a schematic view of a permanent magnet stepping motor in the preferred embodiment of the invention, and FIG. 3B is a cross-sectional view of the permanent magnet stepping motor in FIG. 3A. Referring both to FIG. 3A and FIG. 3B, a PM stepping motor, such as a claw pole permanent magnet (PM) stepping motor, includes a rotor structure 40 and a stator 60. The stator 60 circumnavigates the rotor structure 40 and has several coils, such as coils 61, 62. When the stator 60 is received electric power, the coils 61, 62 of the stator 60 provide a magnetic field to the rotor structure 40. Then, the magnetic field vanishes due to no electric power supply sequentially. As a result, the changing of the magnetic fields would make the axis 41 of the rotor structure 40 rotating.

The rotor structure 40 applied to the permanent magnet stepping motor in the preferred embodiment may, however, be embodied in many different forms. Two different forms of the rotor structure 40 will be illustrated as follow. At first, referring to FIG. 4A, it is a schematic view of the rotor structure of the permanent magnet stepping motor in FIG. 3A. The rotor structure 40 includes an axis 41, a first N multipolar yoke 42, a first permanent magnet 43, a first S multipolar yoke 44, a spacer 45, a second N multipolar yoke 46, a second permanent magnet 47, and a second S multipolar yoke 48.

The first N multipolar yoke 42, the first permanent magnet 43, and the first S multipolar yoke 44 form a hamburger-like stack structure (St1). The second N multipolar yoke 46, the second permanent magnet 47, and the second S multipolar yoke 48 form another hamburger-like stack structure (St2). Each N pole of the N multipolar yoke 42, 46 and each S pole of the S multipolar yoke 44,48 are alternately aligned. The spacer 45 is sandwiched between the pair of the multipolar yoke stacks St1, St2. The first multipolar yoke stack St1 forms an equivalent magnetic field of the first permanent magnet 43, and the second multipolar yoke stack St2 forms an equivalent magnetic field of the second permanent magnet 47. It is necessary to be understood that the N and S poles of the first permanent magnet 43 and the second permanent magnet 47 are aligned with high precision, respectively.

Figures 4A, 4B:
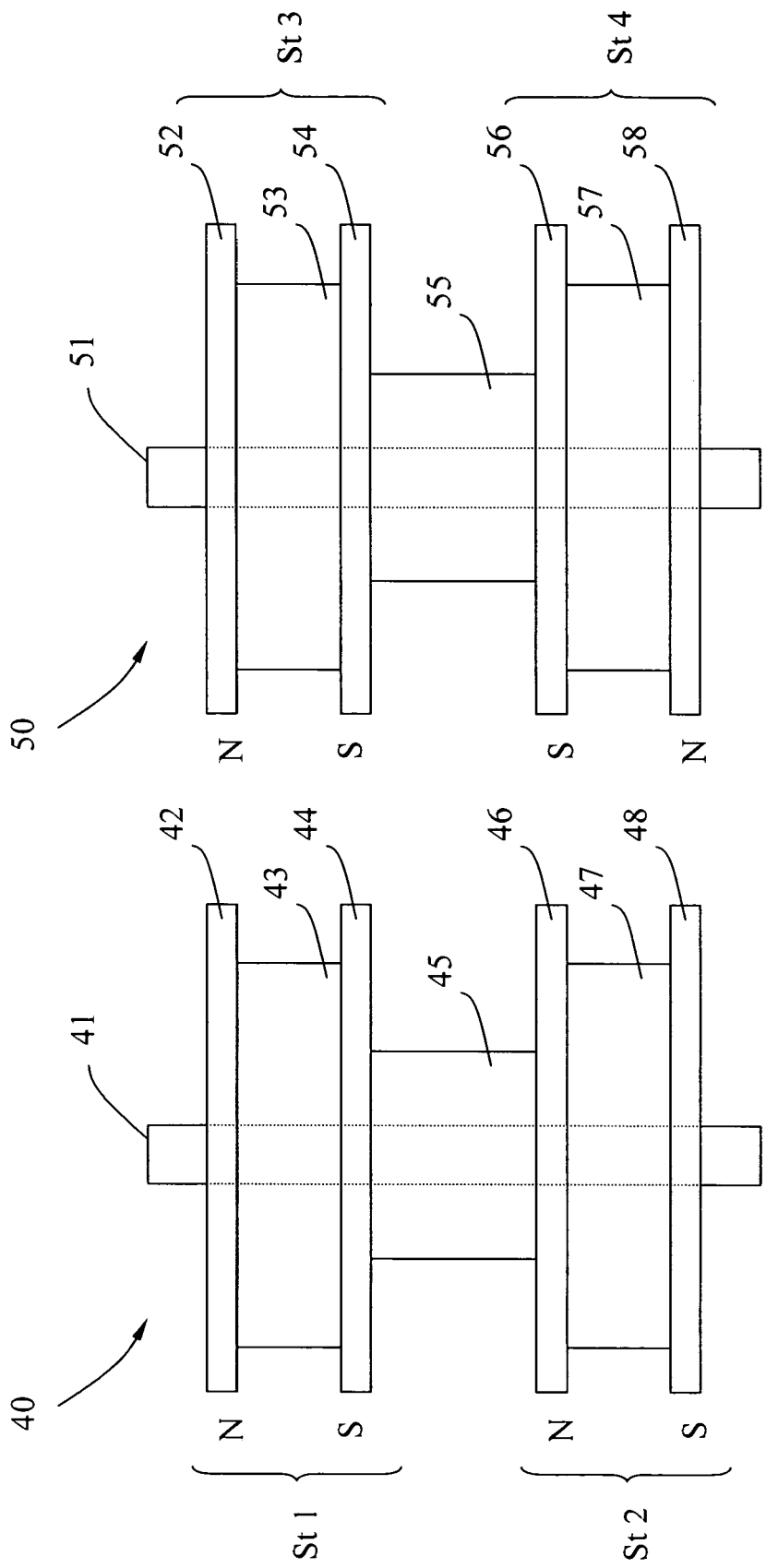
FIG. 4A is a schematic view of the rotor structure of the permanent magnet stepping motor in FIG. 3A.
FIG. 4B is a schematic view of another rotor structure applied for the permanent magnet stepping motor in FIG. 3A.
Figure 5:
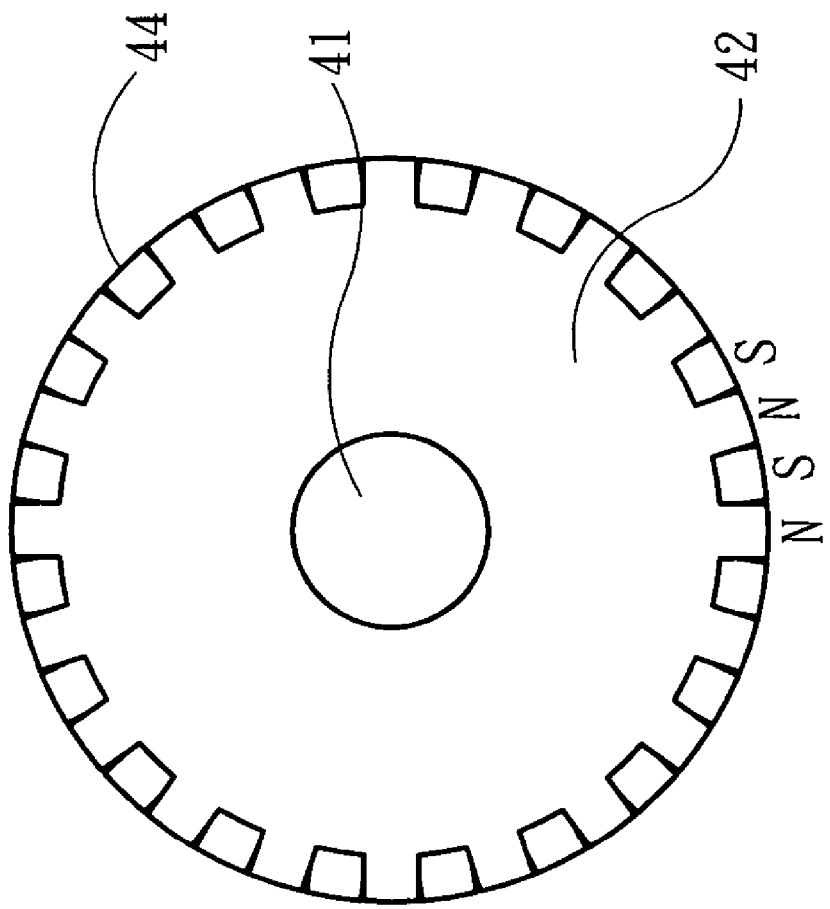
FIG. 5 is a top view of the rotor structure in FIG. 4A.
Figure 6:
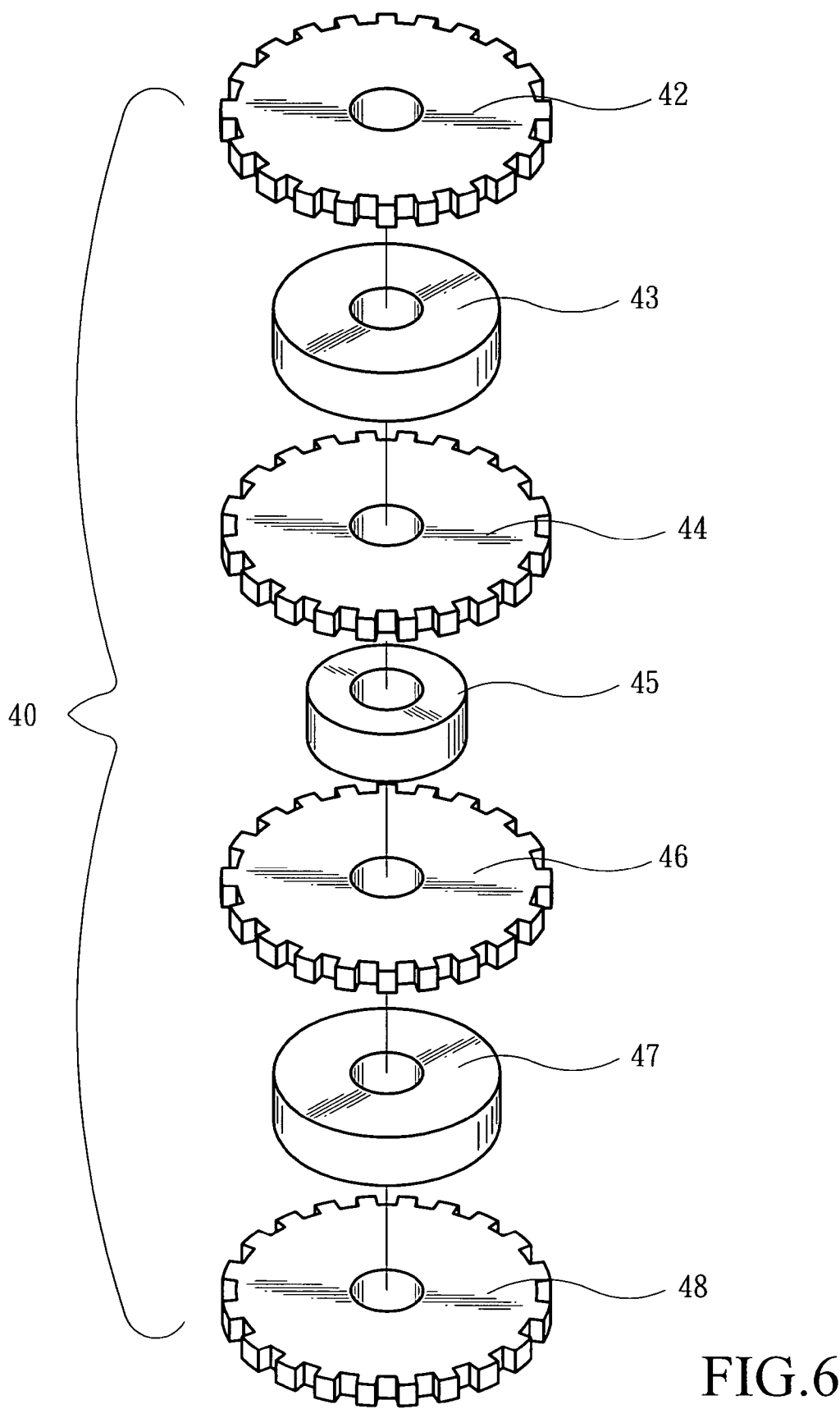
FIG. 6 is an exploded view of the rotor structure in FIG. 4A.

Referring both to FIG. 5 and FIG. 6, FIG. 5 is a top view of the rotor structure in FIG. 4A, and FIG. 6 is an exploded view of the rotor structure in FIG. 4A. The periphery of each multipolar yoke 42, 44, 46, 48 is preferably formed into a gear shape, and the N multipolar yokes 42, 46 and the S multipolar yokes 44, 48 are alternately disposed. From top to bottom, the poles are arranged in the pattern of N-S-N-S. As a result, the desired multipolar equivalent magnetic field can be achieved.

Next, referring to FIG. 4B, it is a schematic view of another rotor structure applied for the permanent magnet stepping motor in FIG. 3A. A rotor structure 50 includes an axis 51, a first N multipolar yoke 52, a first permanent magnet 53, a first S multipolar yoke 54, a spacer 55, a second S multipolar yoke 56, a second permanent magnet 57, and a second N multipolar yoke 58.

The first N multipolar yoke 52, the first permanent magnet 53, and the first S multipolar yoke 54 form the above-mentioned hamburger-like stack structure (St3). The second S multipolar yoke 56, the second permanent magnet 57, and the second N multipolar yoke 58 form another hamburger-like stack structure (St4). The spacer 45 is sandwiched between the pair of the multipolar yoke stacks St3, St4. The third multipolar yoke stack St3 forms an equivalent magnetic field of the first permanent magnet 53, and the fourth multipolar yoke stack St4 forms an equivalent magnetic field of the second permanent magnet 57.

The difference between the rotor structure 40 in FIG. 4A, and the rotor structure 50 in FIG. 4B is that the magnetic poles of the multipolar yoke stacks St1 and St2 are aligned in the pattern of N-S-N-S as shown in FIG. 4A, but the magnetic poles of the multipolar yoke stacks St3 and St4 are aligned in the pattern of N-S-S-N. Although the alignment of the magnetic poles of the multipolar yoke stacks are different, the equivalent magnetic field of the permanent magnets can be both formed with the multipolar yoke stacks having the magnetic poles aligned neither in the pattern of N-S-N-S or in the pattern of N-S-S-N.

Moreover, the pole pitch between each N multipolar yoke and each S multipolar yoke is the same as the pole pitch between two adjacent coils of the stator when viewed along a direction of the axis. Referring to FIG. 3B and FIG. 4A, the pole pitch between the N multipolar yoke 42 and the S multipolar yoke 44, and the pole pitch between the N multipolar yoke 46 and the S multipolar yoke 48 are the same as the pole pitch between the coils 61, 62 of the stator 60 when viewed along a direction of the axis 41.

In FIG. 4A, and FIG. 4B, two stacks of multipolar yoke stacks can be further exemplified. In fact, more than two stack structures can also be adopted. Each of the N multipolar yokes and the S multipolar yokes can be made of a single piece multipolar yoke or a multi-piece multipolar yoke. The material of the N multipolar yoke, and the material of the S multipolar yoke can be silicon steel or other ferromagnetic materials.

As described hereinbefore, by employing the PM stepping motor according to the preferred embodiment of the present invention, the two permanent magnets respectively sandwiched between two stacks of multipolar yokes form an equivalent magnetic field. Therefore, neither the magnet materials nor the magnetization technology does not limit such a hamburger-like stack structure, and the less pole pitch, preferred 0.3 millimeters (mm.), can be achieved. Also, by employing the rotor structures 40, 50 disclosed in the preferred embodiment, each element in the rotor structures can be produced individually and they can be easily assembled.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A permanent magnet (PM) stepping motor, which comprises:
   a rotor structure, comprising:
   an axis;
   a plurality of multipolar yoke stacks, each of which includes an N multipolar yoke, a permanent magnet and an S multipolar yoke combined as a hamburger-like structure, wherein each N pole of the N multipolar yoke and each S pole of the S multipolar yoke have peripheries with a plurality of gear-shaped structures, which are alternately arranged in a staggered manner; and the magnetic poles of the plurality of multipolar yoke stacks are aligned in the pattern of N-S-S-N or S-N-N-S, wherein the N poles of one multipolar yokes stack are aligned with the S poles of another multipolar yoke stack and the S poles of one multipolar yoke stack are aligned with the N poles of another multipolar yoke stack; and
   at least one spacer, sandwiched between each pair of the multipolar yoke stacks; and
   a stator comprising a plurality of coils which respectively circumnavigate the axis and the multipolar yoke stacks and providing a magnetic field for the multipolar yoke stacks to make the axis rotating.

2. The PM stepping motor of claim 1, wherein the N multipolar yoke has a structure of one or more than one layer.

3. The PM stepping motor of claim 2, wherein the material of the N multipolar yoke is selected from the group consisting of silicon steel and ferromagnetic materials.

4. The PM stepping motor of claim 1, wherein the S multipolar yoke has a structure of one or more than one layer.

5. The PM stepping motor of claim 4, wherein the material of the S multipolar yoke is selected from the group consisting of silicon steel and ferromagnetic materials.

6. The PM stepping motor of claim 1, wherein a pole pitch between each N multipolar yoke and each S multipolar yoke is the same as a pole pitch between two adjacent coils of the stator when viewed along a direction of the axis.

7. The PM stepping motor of claim 1, wherein the PM stepping motor is a claw pole PM stepping motor.

* * * * *